United States Patent
Fowkes

(10) Patent No.: US 7,786,250 B2
(45) Date of Patent: Aug. 31, 2010

(54) VECTOR DIRECTIONAL POLYMER SYSTEMS AND METHODS OF NANO-STRUCTURAL SELF ASSEMBLY

(76) Inventor: Steven W. Fowkes, P.O. Box 4029, Menlo Park, CA (US) 94026

( * ) Notice: Subject to any disclaimer, the term of this patent is extended or adjusted under 35 U.S.C. 154(b) by 369 days.

(21) Appl. No.: 11/544,274

(22) Filed: Oct. 6, 2006

(65) Prior Publication Data

US 2007/0106058 A1    May 10, 2007

Related U.S. Application Data

(63) Continuation-in-part of application No. 10/788,509, filed on Feb. 27, 2004, now Pat. No. 7,160,978.

(60) Provisional application No. 60/450,302, filed on Feb. 27, 2003, provisional application No. 60/724,523, filed on Oct. 7, 2005.

(51) Int. Cl.
    *C08G 69/08* (2006.01)
    *C08G 69/26* (2006.01)

(52) U.S. Cl. .............. 528/310; 424/310; 424/335; 427/2.1; 427/402; 428/36.9; 428/36; 428/91; 428/412; 435/135; 435/306; 435/404; 528/272; 528/335

(58) Field of Classification Search ........ 528/310, 528/335, 272; 424/310, 335; 427/2.1, 402; 428/36.9, 36.91, 412; 435/135, 306, 404
    See application file for complete search history.

(56) References Cited

U.S. PATENT DOCUMENTS

| | | | |
|---|---|---|---|
| 3,893,956 A | 7/1975 | Brandt | 260/18 TN |
| 4,066,585 A | 1/1978 | Schepp et al. | 260/18 N |
| 4,385,170 A | 5/1983 | Hirami et al. | 528/338 |
| 4,698,396 A | 10/1987 | Drawert et al. | 525/420.5 |
| 4,722,963 A | 2/1988 | Whyzmuzis | 524/606 |
| 4,758,639 A | 7/1988 | Koyanagi et al. | 526/62 |
| 4,820,765 A | 4/1989 | Whyzmuzis | 524/606 |
| 5,627,258 A | 5/1997 | Takayama et al. | 528/338 |
| 6,214,923 B1 | 4/2001 | Goto et al. | 524/514 |
| 6,495,680 B1 * | 12/2002 | Gong | 540/456 |
| 6,555,614 B2 | 4/2003 | Takanashi et al. | 524/589 |
| 7,122,618 B2 | 10/2006 | Witteler et al. | |
| 2002/0012806 A1 | 1/2002 | Flepp et al. | |

FOREIGN PATENT DOCUMENTS

| | | |
|---|---|---|
| JP | 2000273319 A | 3/2000 |
| JP | 2001106909 A | 4/2001 |
| WO | WO 9603114 | 2/1996 |
| WO | WO 03/055859 A1 | 10/2003 |

OTHER PUBLICATIONS

Birkett, Annu. Rep. Prog. Chem, Sect. A, 2002, vol. 98, 455-477.).*
P.R. Birkett Department of Chemistry and Materials, Manchester Metropolitan University, Joahn Dalton Building, Annual Reports on the Progress of Chemistry, Section A . Published Sep. 17, 2001.*
Hajipour, et al. Synthesis and characterization of novel optically active polyamide-imide via direct amidation. Department of Pharmacology, Univ. 2005, (41)(10), abstract only.
Macdonald et al., Polymers from intermediates obtained from hydrogen cyanide, Journal of Polymer Science (1974, 12 (3) abstract only.
Mehdipour-Ataei et al., Synthesis and characterization of novel heat resistant polyamide amides. European Polymer Journal (2005), 41 (9), abstract only.
Non-Final Office Action dated Aug. 27, 2009, U.S. Appl. No. 11/523,266, Filed Sep. 18, 2006, Steven W. Fowkes.

* cited by examiner

*Primary Examiner*—Terressa M Boykin
(74) *Attorney, Agent, or Firm*—Haverstock & Owens LLP

(57) ABSTRACT

Vector-directional polymers and polymer systems are disclosed. In accordance with the embodiments of the invention, the polymer has aromatic moieties that are restrained or fixed through conformational linkage units bonding nearest neighbor aromatic moieties together to form the polymer backbone. The conformational linkage units preferably include conformational ring structures which exhibit hydrogen bonding or other Lewis acid-Lewis base type of interactions. The conformational ring structures can include hetero-atoms and cationic metal atoms. The chemical groups and bonding features of the polymer backbone constrain bond movement and bond rotation along the polymer backbone. Accordingly, the vector-directional polymers of the present invention can assemble into or form extended three dimensional structures or arrays.

25 Claims, 12 Drawing Sheets spiral configuration
(side view)

VECTOR DIRECTIONAL POLYMER SYSTEMS AND METHODS OF NANO-STRUCTURAL SELF ASSEMBLY

RELATED APPLICATIONS

This application is a continuation-in-part Application of U.S. patent application Ser. No. 10/788,509, titled "AROMATIC AMIDE POLYMER SYSTEMS AND METHODS FOR MAKING THE SAME", filed Feb. 27, 2004 and is issued as U.S. Pat. No. 7,160,978, which claims priority under 35 U.S.C. §119 (e) of the co-pending U.S. Provisional Patent Application Ser. No. 60/450,302, filed Feb. 27, 2003, and titled "AROMATIC AMIDE POLYMERS AND METHOD FOR USE." This U.S. Patent Application also claims priority under 35 U.S.C. §119 (e) of the co-pending U.S. Provisional Patent Application Ser. No. 60/724,523, filed Oct. 7, 2005, and titled "AROMATIC AMIDE POLYMER SYSTEMS AND METHOD FOR MAKING THE SAME." The U.S. patent application Ser. No. 10/788,509, titled "AROMATIC AMIDE POLYMER SYSTEMS AND METHODS FOR MAKING THE SAME", filed Feb. 27, 2004 and is issued as U.S. Pat. No. 7,160,978, the U.S. Provisional Patent Application Ser. No. 60/450,302, filed Feb. 27, 2003, and titled "AROMATIC AMIDE POLYMERS AND METHOD FOR USE", and the Provisional Patent Application Ser. No. 60/724,523, filed Oct. 7, 2005, and titled "AROMATIC AMIDE POLYMER SYSTEMS AND METHOD FOR MAKING THE SAME," are all hereby incorporated by reference.

FIELD OF THE INVENTION

This invention relates generally to polymer systems and methods for making polymers. More specifically, this invention relates to polymers and polymer systems with ordered and extended structures and methods for making the same.

BACKGROUND

Standard-art polymers have multiple backbone bonds with no significant restraints on bond rotational freedom. For example, the aliphatic backbone bonds in polyolefins are all free to rotate. In Nylons and proteins, the carbon-carbon backbone bonds and half of the carbon-nitrogen backbone bonds are free to rotate. Even in aromatic polymers with rigid rings (aramids like Kevlar and Nomex, bisoxazoles like Zylon, and imidazoles like M5), there are backbone bonds which have some degree of rotational freedom and which can allow a multiplicity of backbone conformations. There are only a few arguable exceptions in structurally and conformationally isolated cases, like with Zylon, where the multiple rotatable bonds happen to be nearly coaxial with respect to each other, and with polyacetylene, polyphenylene and M5, where the polymer linkages are para-only and the polymer subunits are axially symmetric. Outside of these arguable "special cases" involving unsubstituted, linear-only (unidirectional) polymers, bond rotational freedom prevents conformational determinism of the polymer backbones. In other words, standard-art polymers are either rigid rods (analogous to uncooked spaghetti noodles) or flexible strands (overcooked spaghetti noodles). There is a continued need to make polymers that exhibit extended, or backbone vector directionality in two or three dimensions. Such polymers can be used to make nano-structured materials for variety of different applications, including electronic fabrication technologies, aerospace technologies, biological technologies and medical technologies to name a few.

SUMMARY OF THE INVENTION

The present invention is directed to polymers and polymer systems that can form extended two and three-dimensional structures and hence are referred to as vector-directional polymers. The backbones of the polymers, or portions thereof, are energetically and/or sterically stabilized to have conformational rigidity or semi-rigid as a result of a combination of chemical groups and bonding features, such as are described below. These chemical groups and bonding features constrain bond movement and bond rotation along the polymer backbone and between nearest neighbor aromatic moieties.

The polymers in accordance with the embodiments of the invention, include a backbone consisting of aromatic moieties bonded together with what are refereed to herein as "conformational linkage units." The aromatic moieties are benxenoid structures and/or heterocyclic structures. The heterocyclic aromatic moieties can include, for example, one or more nitrogen atoms and still have a substantial degree of aromatic character (delocalized pi-bonding).

The conformational linkage units can include one or more conformational ring structures that can include hetero-atoms. Where a conformational ring structure includes one or more hetero-atoms, the structure is also referred to herein as a "conformational heterocyclic structure." The conformational ring structures typically include hydrogen atoms that engage in hydrogen bonding to form or close the conformational ring structures. In addition to the hydrogen bonding described above, the conformational ring structures can include other Lewis acid features (election acceptors) that interact with adjacent Lewis base features (electron donors) in the conformational ring structures and provide ionic interactions that form or close the conformational ring structures. For example, the conformational ring structures can include hetero atoms, such as nitrogen atoms that act as Lewis bases, and/or metal atoms that act as Lewis acids. Where the conformational ring structures include metal atoms, the metal atoms are preferably cationic metal atoms from the s-block of the periodic table. For example, metals atoms used in the present invention include, but are not limited to, lithium, beryllium, sodium, magnesium, potassium and calcium. It will be clear to one skilled in the art that a number of transition metal ions can also can be employed with the present invention. Because many of the ring structures described above are not closed or bonded through purely covalent bonds, the term conformational ring structure has been used herein. Alternatively the ring structures described above terms could be called virtual ring structures.

The conformational ring structures include direct bond linkages that bond neighboring aromatic moieties through covalent bonds. These direct bond linkages can include 2 to 6 atoms, but preferably have three or fewer atoms. The direct bond linkages can include hetero atoms, such as nitrogen atoms and can also include atoms that are structurally shared between o common to more than one conformational ring structures.

Because of the conformational rigidity of the aromatic moieties and the semi-rigidity of the conformational linkage units that interconnect the aromatic moieties, each polymer of this invention assembles into a specific conformation determined by the monomers from which is it assembled. And because of structural and isomeric variability of monomers within each polymer class, each polymer system of this invention can be used to assemble a multiplicity of extended three-dimensional structures or arrays. These extended structures may be straight rods (e.g., see FIGS. 11*a-b*); sinusoids;

circles, coils or tubes (e.g., see FIGS. 12a-b, and schematic of FIG. 13b); polygons and polygonal cross-section tubes (FIG. 12a, but with straight-rod diamine oligomer); planar films; weaves (see schematic FIG. 13a); meshes and tangles (with mixed-vector monomer blending); matrices and latices (e.g., FIG. 13a, but with reversed positions of primary and secondary functionalities); and combinations of the above.

In a particular embodiment of the invention, the polymer backbone is an amide polymer that can include aromatic structures and/or heterocyclic structures that are linked together through amide linkages or moieties. Amide polymers and amide linkages that form them are described in detail in the U.S. patent application Ser. No. 10/788,509, titled "AROMATIC AMIDE POLYMER SYSTEMS AND METHODS FOR MAKING THE SAME", the contents of which are incorporated by reference.

Also, in accordance with the present invention, conformational rigidity of the conformational linkage units can bond nearest neighbor aromatic moieties throughout the polymer backbone or the conformational rigidity or the conformational linkage units can be interspersed throughout the backbone of the polymer in an ordered, random or blocked fashion. Thus the present invention can be used to make rigid polymer structures, semi-rigid polymer structures or polymer structures with rigid sections linked through flexible sections.

DETAILED DESCRIPTION

Figure 1A:
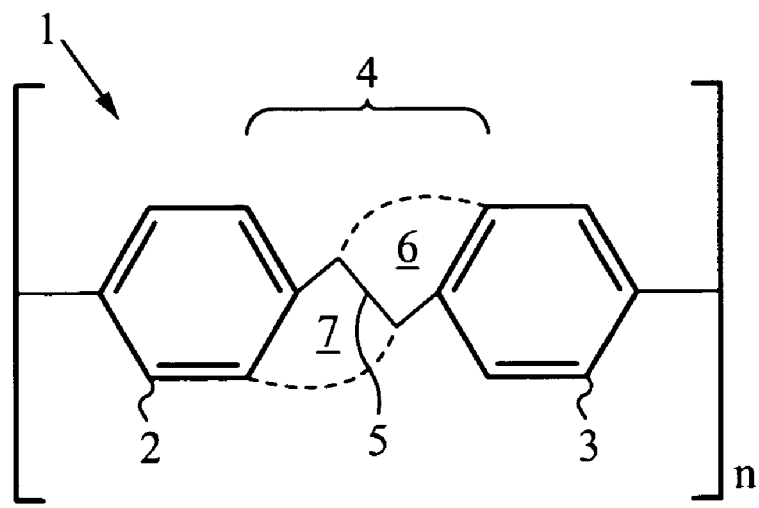
FIG. 1a shows a schematic representation of a portion of a polymer backbone, in accordance with the embodiments of the invention.

The present invention utilizes selectively chemically modified aromatic (pi-bonded) molecular sub-assemblies (i.e., aromatic mono- and/or polycyclic monomers), the modified features (chemical groups or atomic constituents) of which form secondary bonds (bonds in addition to the initial, essential and/or primary polymer linkage bonds) with one or more chemical features of their adjacent polymer linkages and/or with one or more chemical features of adjacent (nearest or second-nearest neighbor) monomers to form additional bonds that form new covalent, metallo-ionic and/or hydrogen-bonded rings which restrict bond rotation and movement of bonds within the polymer linkage and newly formed ring or conformational linkage unit to a single, preferred conformation. Additionally, chemical features may also restrict bond rotation through steric hindrance which blocks or obstructs conformations that might otherwise be possible or likely.

Aromatic molecular systems or moieties are bonded together by pi-bonds, which constrain all involved atoms to lie in a single plane. In linear aromatic systems, pi bonds may flip, invert or rotate, converting from a cis to trans (or right to left, or up to down) conformation. However, in aromatic ring systems of 3, 4, 5, 6 and 7 atoms, the circular connections between pi-bonded atoms does not allow any bond rotation within the rings. This has structural utility to chemists in creating stereospecific molecules (e.g., ortho, meta and para orientations). However, single bonds connecting the rings to other, external atoms are capable of rotation. This invention specifies methods for involving these "external" atoms in additional ring systems that form during or following polymerization. These ring systems may be entirely covalent (including aromatic and aliphatic components), or they may contain ionic, metal-coordination and/or hydrogen bonding features. However, despite these variations, these rings have one thing in common: they serve to extend the structural stability, rigidity and stereospecificity of the core monomer aromatic ring system outward into the polymer linkages, which can "overlap" with the adjacent monomers' extended systems to create conformationally deterministic (one-way-only) polymer linkages.

The present invention constrains the rotational freedom of polymer linkages to a single sterically and energetically preferred orientation or conformation. In turn, this allows the stereospecific features of the monomer subunits to be preserved and conserved down the polymer strand, instead of being randomized by rotation, hinging and pivoting of standard-art polymer backbones. It is believed that this approach represents a significant advancement in polymer art and the ability to selectively allow bond rotational freedom can advance the synthesis of molecular assemblies that can move in constrained ways and function as mechanical devices at the nano scale.

It is believed that the polymers and polymer systems of the present invention can be used to make straight rods, sinusoids, circles, coils, tubes, polygons, polygonal tubes, weaves, meshes, tangles, lattices, matrices, and combinations thereof.

FIG. 1a shows a schematic representation of a polymer backbone structure 1, in accordance with the embodiments of the invention. The polymer backbone structure 1 includes nearest neighbor aromatic moieties 2 and 3. The nearest neighbor aromatic moieties 2 and 3 are bonded together through a conformational linkage unit 4. The conformational linkage unit 4 includes a directed bond linkage 5 that covalently bonds the nearest neighbor aromatic moieties 2 and 3. The directed bond linkage 5 can include two to six atoms, but preferably includes three or fewer atoms. The atoms within the directed bond linkage 5 can exhibit double bond character and can be hetero atoms. The conformational linkage unit 4 also includes one or more conformational ring structure 6 and 7, which can also include hetero atoms. The conformational ring structures 6 and 7 prevent or restrict rotation or movement between nearest neighbor aromatic moieties 2 and 3 through or around the direct bond linkage 5.

The conformational ring structures 6 and 7 typically include hydrogen atoms that engage in hydrogen bonding to form or close the conformational ring structures 6 and 7. Alternatively, or in addition to the hydrogen bonding described above, the conformational ring structures can include other Lewis acids (election acceptors) that interact with a Lewis bases (electron donors) that provide ionic interactions that form or close the conformational ring structures. For example, the conformational ring structures 6 and 7 can include hetero atoms, such as nitrogen atoms that act as Lewis bases, and/or metal atoms that act as Lewis acids. Where the conformational ring structures include metal atoms, the metal atoms are preferably cationic metal atoms from the s-block of the periodic table. For example, metals atoms used in the present invention include, but are not limited to, lithium, beryllium, sodium, magnesium, potassium and calcium. It will be clear to one skilled in the art that silver ions as well as a number of other transition metal ions can also be employed with the present invention. Because the ring structures described above are closed or bonded through purely covalent bonds, the term conformational ring structure has been used herein.

Figure 1B:
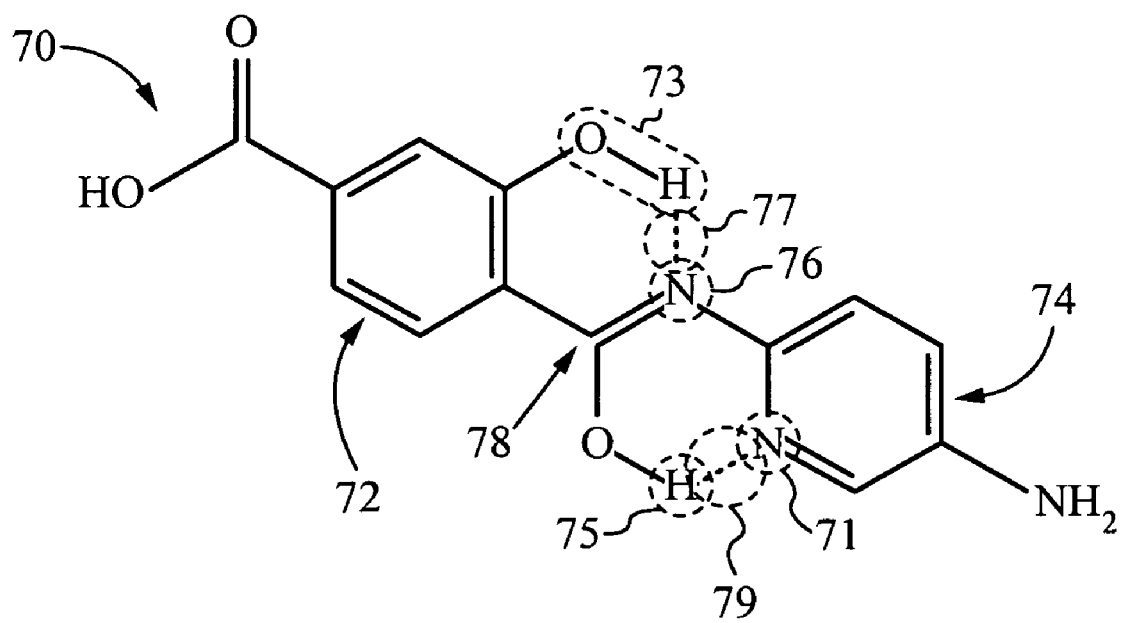
FIG. 1b illustrates nearest neighbor aromatic moieties bonded through amide direct bond linkages and stabilized through conformational ring structures, in accordance with the embodiments of the invention.

FIGS. 1b-c illustrate nearest neighbor aromatic moieties bonded through amide direct bond linkages and stabilized through conformational ring structures, in accordance with the embodiments of the invention. Specifically, FIG. 1b illustrates an iminol-configuration 70 of an direct bond amide linkage 78 with an aromatic structure 72 and a heterocyclic structure 74. There hetero-atom 71, such as a nitrogen atom, that is positioned beta relative to the nitrogen atom 76 that forms the amide leakage 78. The enol-configuration 70 can promote hydrogen bonding 79 between the iminol-hydrogen atom 75 and the hetero-atom 71. In addition, the enol-configuration 70 can have a hydroxyl group or alcohol functional group 73 that is positioned beta on the aromatic structure 72 relative to the carbon atom on the amide linkage 78. It is believed that hydroxyl groups, such as the hydroxyl group 73, can contribute to hydrogen bonding to the nitrogen atom 76 that forms the amide linkage 78, as indicated by the dotted line 77, and thus form an additional conformational ring structure that stabilize the conformation of the iminol-configuration 70. The hydrogen bond 77 is believed to further stabilize the amide linkage 78 and add to the rigidity and/or stability of an extended polyamide structures having multiple amide linkages, as shown.

FIGS. 2a-d are used to illustrate how aromatic moieties are stabilized through a conformational ring structure, in accordance with the embodiments of the invention. A basic aromatic polymer structure (see FIG. 2a) of directly connected benzene rings (102), allows each ring to rotate about the carbon-carbon bonds 101 between rings, and the introduction of an annular nitrogen atom (112, FIG. 2b) alpha to the connecting bond (101) on one side of the connecting bond and a hydroxy group 113 on the same position on the opposite side of the connecting bond (also alpha positioned) allows a hydrogen bond 114 to form a new ring 115, which can only form when both the annular nitrogen atom 112 and hydroxy group 113 are on the same side of the carbon-carbon 101 bond (i.e., the nitrogen and hydroxy are cis oriented with respect to each other). This extra bonding feature 117 not only provides a stabilizing influence for one conformation over the other, it also destabilizes the alternative conformation (see FIG. 2c) by creating steric conflict (*) between the neutral, beta-located ring hydrogen atom 121 and the electronegative oxygen atom 123 of the hydroxy group. By destabilizing the trans conformation and stabilizing the cis conformation, this bonding feature converts an otherwise non-deterministic polymer linkage into a deterministic one. In other words, only one backbone conformation is favored.

Through the specific placement of aromatic ring systems annular (ring) nitrogen atoms and hydroxy groups, the polymer backbone can be directed into any number of simple or convoluted conformations.

A similar bonding feature can also be created by use of a thiol instead of a hydroxy group, using a metal ion instead of a hydrogen ion to create oxygen-metal and metal-nitrogen coordination bonds. A similar but oppositely charged bonding feature can be created by the use of annular boron atoms instead of annular nitrogen atoms (see FIG. 2d), with requisite anionic instead of cationic functionality on the opposite ring. Such anionic functionalities include but are not limited to nitro (shown), nitrate, nitrite, nitroso, carboxylate (shown), carbonate, borate, phosphate, perchlorate, sulfonyl (shown), sulfate, sulfite and sulfoxide groups, ethers and/or esters.

Figure 2A:
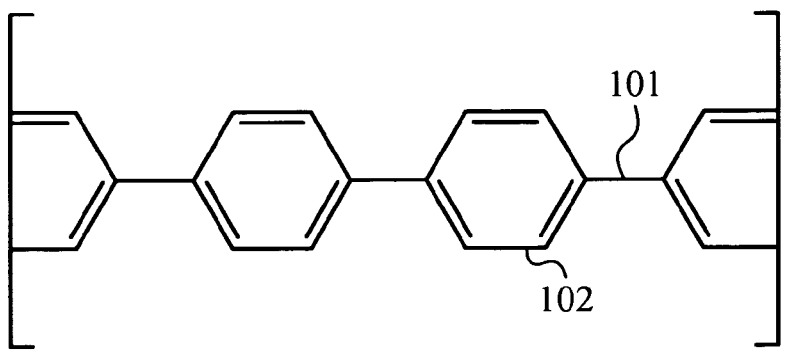
FIGS. 2a-d illustrate how aromatic moieties are stabilized through a conformational ring structure, in accordance with the embodiments of the invention.
Figure 2B:
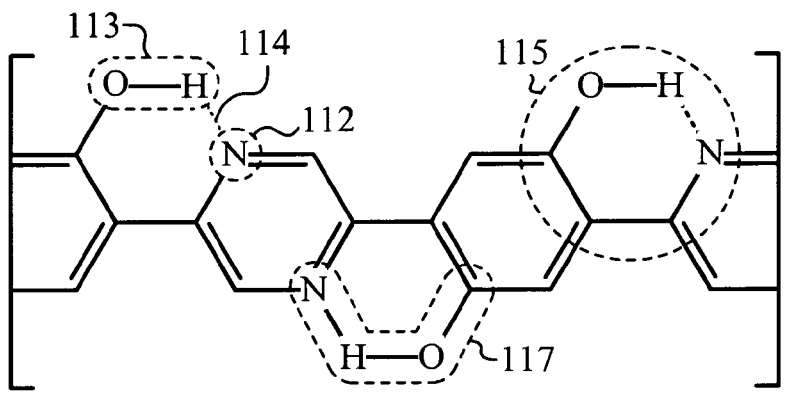
Figure 2C:
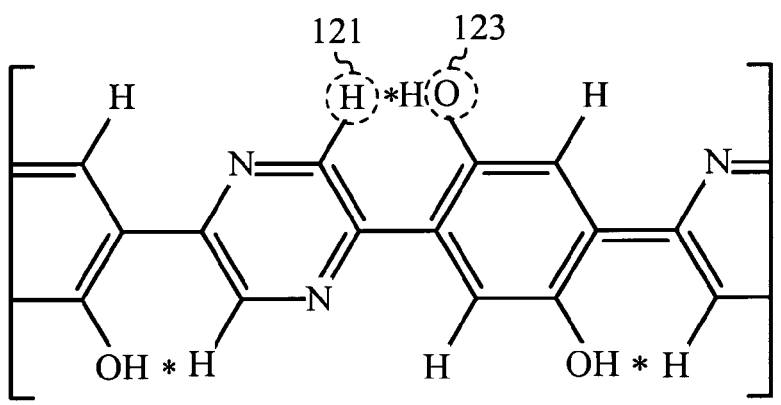
Figure 2D:
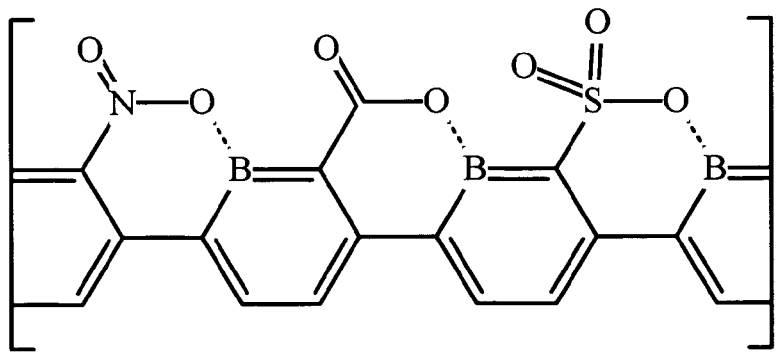

The above bonding features may also be described as interactions between Lewis acids and Lewis bases. In FIG. 2b, the annular nitrogen atom 112 serves as a Lewis-base feature which bonds with a proximal Lewis-acid feature (the proton located on the hydroxy (113), amino or thiol group, or a metal-atom analog of such groups), which is located on the adjacent ring (i.e., on the other side of the rotatable bond). Similarly, the annular boron atoms in FIG. 1d serve as Lewis acids which bond to proximal Lewis-base features connected to the adjacent ring system. The use of Lewis acid-base pairings in these examples is not intended to exclude the use of two Lewis base groups and a Lewis-acid "bridging" group (e.g., two annular nitrogen atoms with coordination bonds to a transition metal) or two Lewis acids bridged by a Lewis base. These examples are also not meant to exclude covalent linkages, examples of which will be discussed below.

Figure 3A:
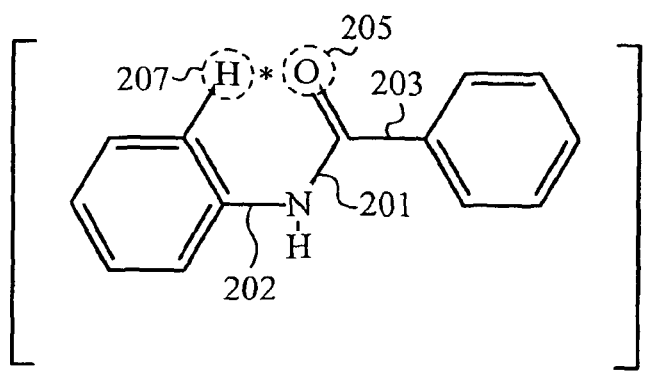
FIGS. 3a-b illustrate how aromatic moieties are stabilized through a two-atom direct bond linkage and a conformational ring structure that exhibits hydrogen bonding, in accordance with the embodiments of the invention.
Figure 3B:
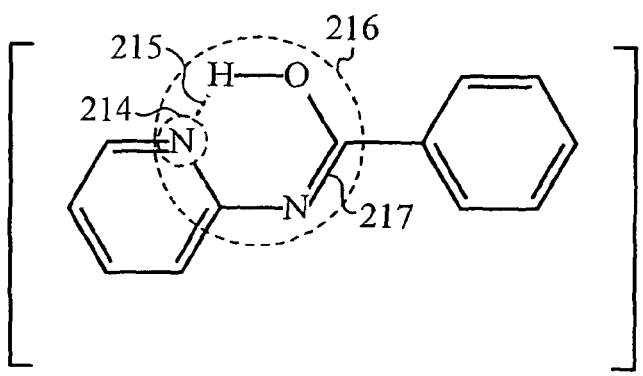

FIGS. 3a-b will now used to illustrate how aromatic moieties are stabilized through a two-atom direct bond linkage and a conformational ring structure that exhibits hydrogen bonding, in accordance with the embodiments of the invention. In the situation of aramid polymers, there are two atoms between adjacent aromatic rings, one of which is carbon and the other of which is nitrogen (see FIG. 3a). Bond rotation can occur at all three bonds, but is significantly restricted about the center carbon-nitrogen bond 201 due to its substantial double-bond character. Although there is some double-bond character in the adjacent carbon-nitrogen bond 202 which might otherwise enforce a planar (dual-positioned) conformational state, this is offset by significant steric conflict (*) between the keto oxygen 205 and the adjacent, neutral, ring-hydrogen atom 207. This steric conflict can be resolved and a bonding feature added by inserting a ring nitrogen atom (214, FIG. 3b) at the same beta position as in the previous example, which shifts the keto tautomeric form of the amide bond (see FIG. 3a) into the iminol tautomeric form of the amide bond (see FIG. 3b). This results in the formation of a hydrogen bond 215 and a new, hydrogen-bonded ring structure 216, and increased double bond character of the central carbon-nitrogen bond 217, both of which reduce bond rotation about the carbon-nitrogen bonds 201 and 202 (FIG. 3a). The remaining carbon-carbon bond 203 is outside of this new ring system and is not stabilized against rotation. Additional analog structures involving substitution of sulfur, nitrogen or phosphorus for the amide oxygen are similarly stabilizing for two 201 and 202 of the three linkage bonds.

Figure 4A:
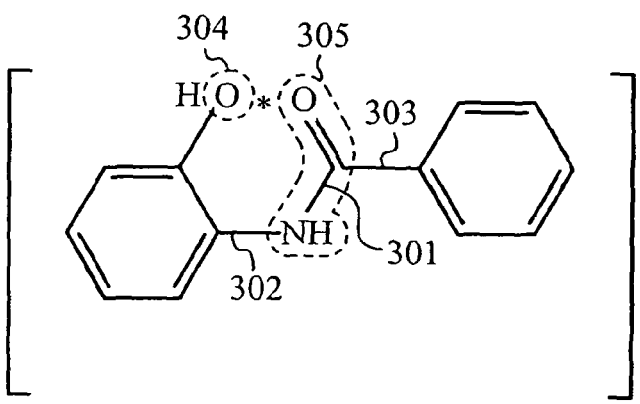
FIGS. 4a-b illustrate how nearest neighbor aromatic moieties are stabilized by a covalently bonded 5-membered ring structure, in accordance alternative embodiments of the invention.
Figure 4B:
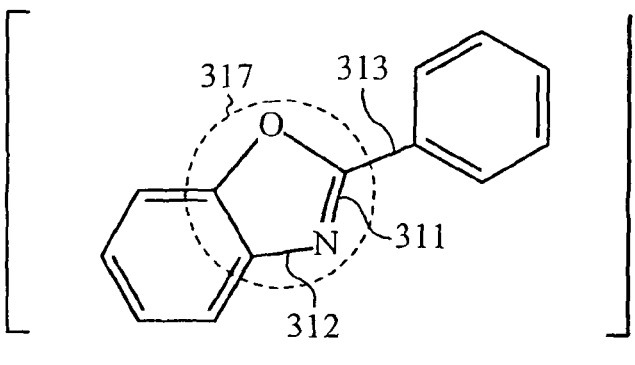

FIGS. 4a-b illustrate how nearest neighbor aromatic moieties are stabilized by a covalently bonded 5-membered ring structure, in accordance with alternative embodiments of the invention. As an alternative to the example shown in FIGS. 4a-b, a hydroxy group (304, FIG. 4a) can be located at the same beta position as above (i.e., ortho to the ring-linkage attachment). Although this creates dramatic steric conflict (*) in this configuration, it also enables a dehydration reaction with the adjacent amide group 305 to produce a 5-membered oxazole ring system (317, FIG. 4b). The oxazole ring system 317 restricts bond rotation of the ring-to-nitrogen (301, 311) and ring-to-carbon (302, 312) bonds of the amide polymer linkage, but like Examples shown in FIGS. 3a-b, does not restrict the carbon-to-ring bond (303, 313). Analogs to those described above include replacement of the hydroxy group and can be a thiol group. If the hydroxy group is substituted with an amine group, an imidazole ring is formed. Although the imidazole ring successfully restricts bond rotation about the same two bonds, the two imidazole nitrogen atoms are essentially equivalent to hydrogen tautomerization, which has disadvantageous conformational consequences that will be discussed later. Elements other than oxygen, sulfur and nitrogen suited to this feature are boron, phosphorus and silicon.

Figure 5A:
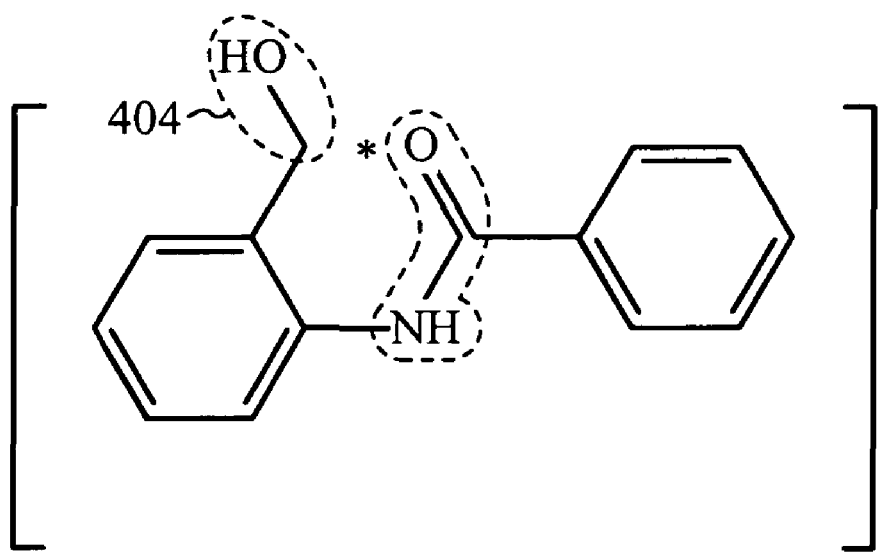
FIGS. 5a-b illustrate how nearest neighbor aromatic moieties are stabilized by a covalently bonded 6-membered ring structure, in accordance alternative embodiments of the invention.
Figure 5B:
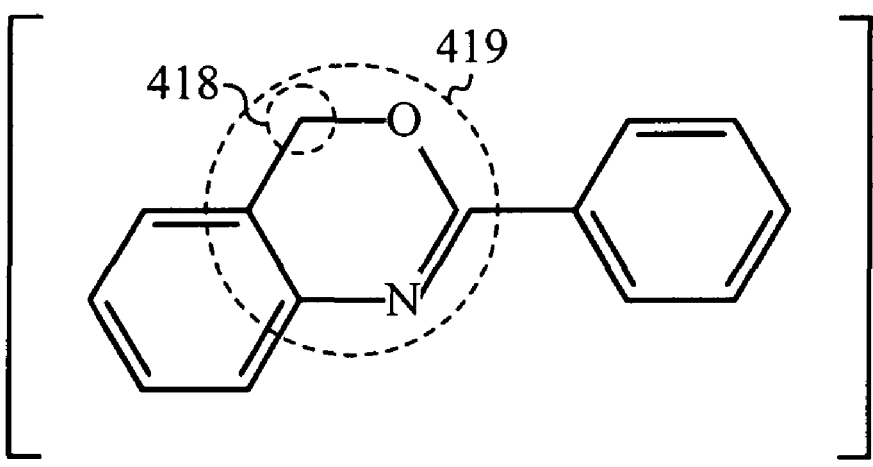

FIGS. 5a-b illustrate how nearest neighbor aromatic moieties are stabilized by a covalently bonded 6-membered ring structure, in accordance alternative embodiments of the invention. Extending the principles described above with reference to FIGS. 4a-b above, a methylhydroxy group 404 can be used (see FIG. 5a). This introduces two differences (see FIG. 5b): 1) the resulting ring 419 is 6-membered instead of 5-membered, and 2) there is a saturated element (the methyl group, 418) in the newly-formed, rotation-restricting ring system 419. The same analogs as discussed above with reference to FIGS. 4a-b also apply in the examples shown in FIGS. 5a-b.

FIGS. 6a-d show examples of nearest neighbor aromatic moieties bonded through two-atom direct bond linkages and stabilized through two conformational ring structures, in accordance with the embodiments of the invention. Note that in the examples above, only two of the three bonds capable of rotation are stabilized. In other words, one bond of the polymer linkage remains unstabilized against rotation. This may be remedied by adding a second bonding feature that forms a second, additional ring system that includes this third bond. In the case of the example shown in FIGS. 3a-b above, this second bonding feature can be a hydroxy (see FIG. 6a) or thiol group, which can hydrogen bond 502 to the amide nitrogen lone electron pair. Metallic analogs of hydrogen bonds are additional types of this example (see FIG. 6b). Lithium 513 is illustrated as an example of a small-ion, pi-bonding metal (such as beryllium and boron, and the larger sodium, magnesium 537 and aluminum ions). Copper 514 is illustrated as an example of a first-period transition metal, although more highly ionized second and third period transition metal and rare earth metals could also be used. Further, while the examples shown in FIGS. 6a and 6b involve 6-membered rings, boron derivatives (and other single-atom Lewis-acid analogs) can create 5-membered stabilizing rings (see 525 in FIG. 6c, and 536 in FIG. 6d). Oxygen analogs of aramids (esters) can be stabilized in a similar manner. This analog, however, has limited aromaticity through the central carbon-oxygen bond due to the extreme charge separation induced by three bonds to the backbone oxygen atom. Since the two stabilizing ring systems (one of which hydrogen bonds to the annular nitrogen atom and the other of which hydrogen bonds to the amide nitrogen atom) share atoms in common (i.e., they "overlap" each other), the aramid polymer linkage is now conformationally determinate (i.e., it has only one preferred conformation), as is the case with the example shown in FIGS. 2a-b above. In other words, if one bonding feature is insufficient to fully stabilize a multi-atom polymer linkage against rotational freedom, a second bonding feature can be added to provide the requisite stabilization. Full stabilization of polymer linkages is a preferred embodiment of this invention.

Figure 6A:
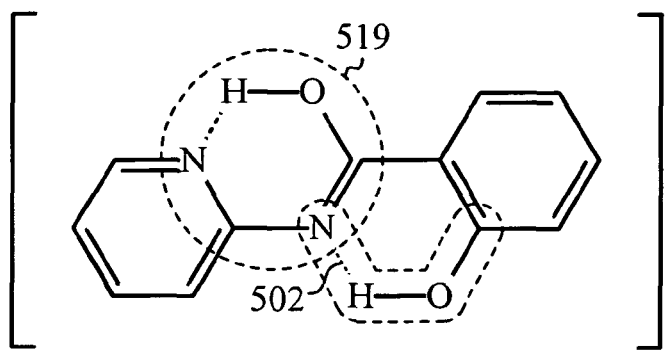
FIGS. 6a-d show examples of nearest neighbor aromatic moieties bonded through two-atom direct bond linkages and stabilized through conformational ring structures, in accordance with the embodiments of the invention.
Figure 6B:
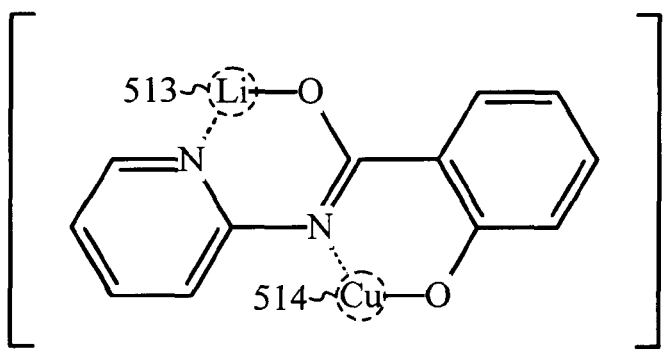
Figure 6C:
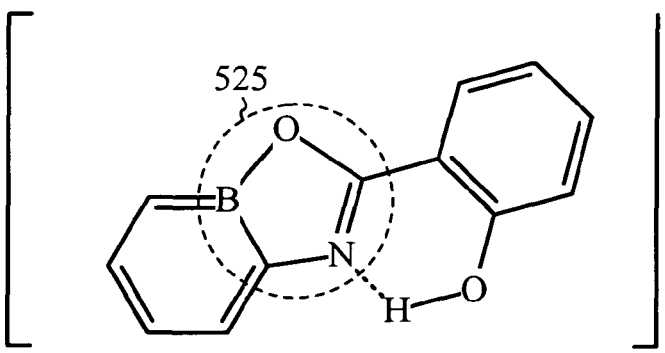
Figure 6D:
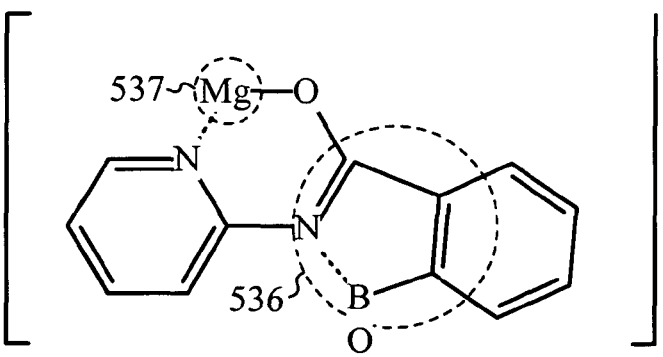
Figure 7A:
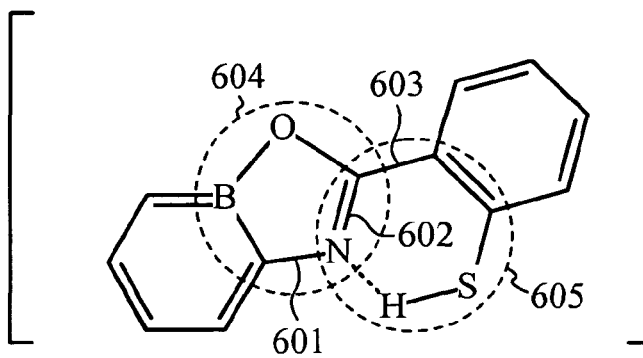
FIGS. 7a-f show further examples of nearest neighbor aromatic moieties bonded through two-atom direct bond linkages and stabilized through conformational ring structures, in accordance with the embodiments of the invention.
Figure 7B:
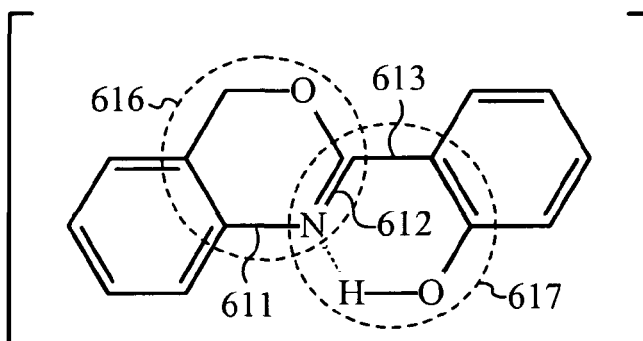
Figure 7C:
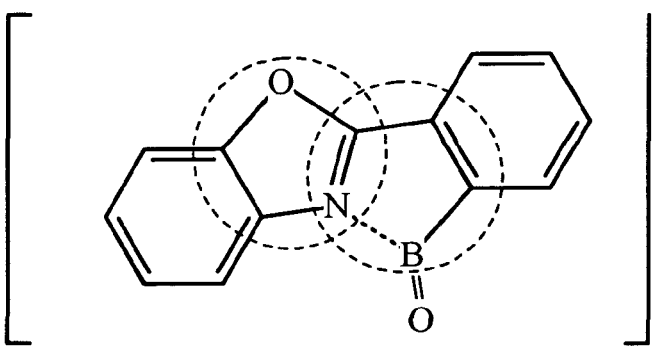
Figure 7D:
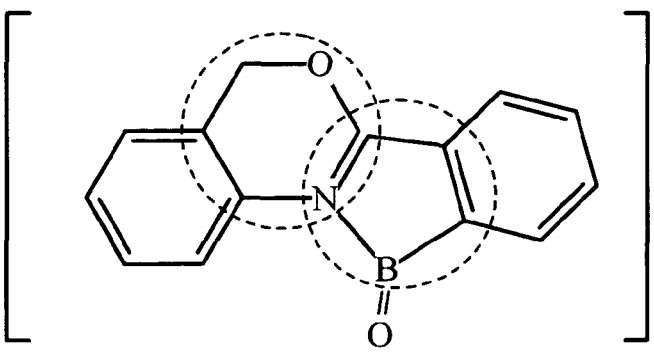
Figure 7E:
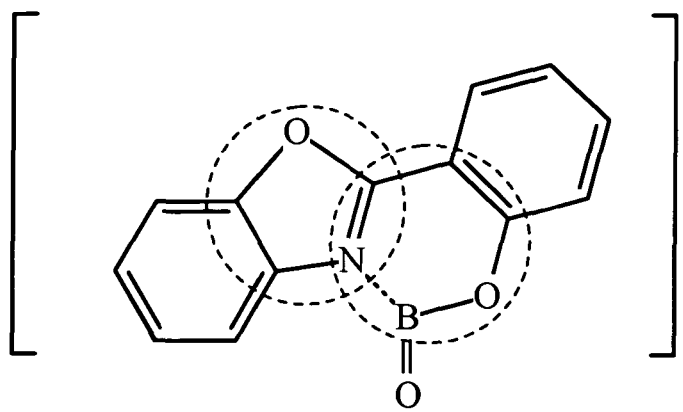
Figure 7F:
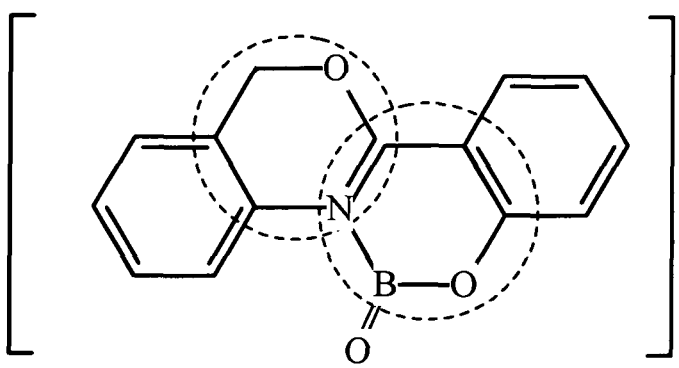

FIGS. 7a-f show further examples of nearest neighbor aromatic moieties bonded through two-atom direct bond linkages and stabilized through conformational ring structures, in accordance with the embodiments of the invention. The same bonding features described with reference to FIGS. 6a-d above to stabilize the third linkage bond such as described in the example shown in FIGS. 3a-b can also be equally applied here (see FIGS. 7a and 7b, respectively). In FIG. 7a, the oxazole ring system 604 stabilizes amide-linkage bonds 601 and 602, and the hydrogen-bonded thiol ring system 605 stabilizes amide-linkage bonds 602 and 603. In FIG. 6b, a covalent ring 616 stabilizes bonds 611 and 612 against rotation and hydrogen-bonded ring 617 stabilizes bonds 612 and 613 against rotation. In situations involving a combination of two bonding features in aromatic polymers with two-atom linkages, the choice of bonding feature can result in two 5-membered rings (see FIG. 7c), a combination of one 5-membered ring and one 6-membered ring (see FIGS. 7d and 7e), or two 6-membered rings (see FIG. 7f).

Figure 8A:
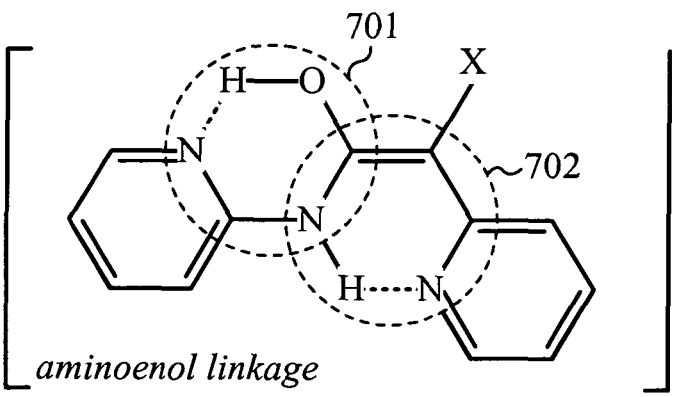
FIGS. 8a-e show examples of nearest neighbor aromatic moieties bonded through three-atom direct bond linkages and stabilized through conformational ring structures, in accordance with the embodiments of the invention.
Figure 8B:
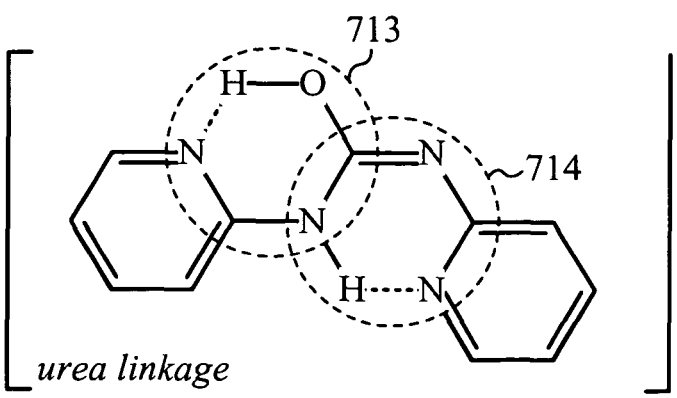
Figure 8C:
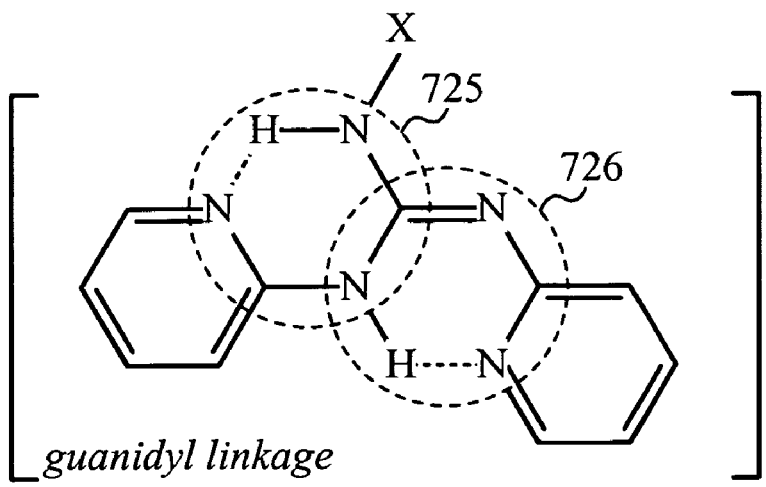
Figure 8D:
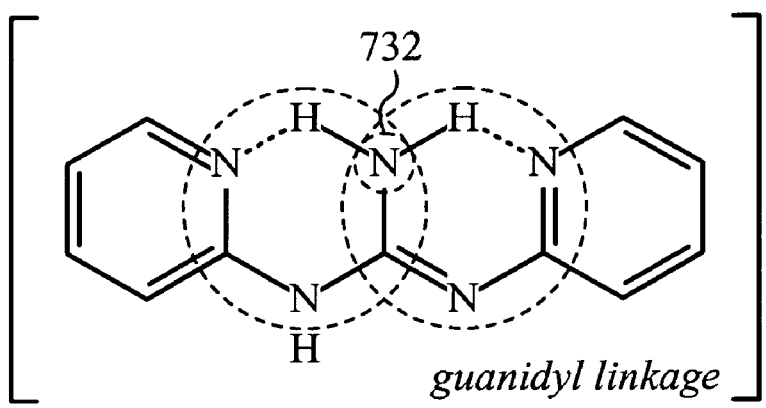
Figure 8E:
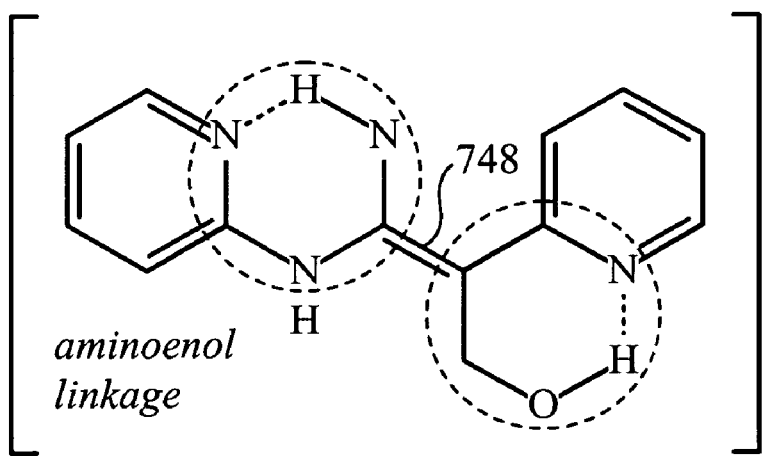

FIGS. 8a-e show examples of nearest neighbor aromatic moieties bonded through three-atom direct bond linkages and stabilized through conformational ring structures, in accordance with the embodiments of the invention. Two-ring stabilization is sufficient to stabilize a three-atom linkage provided that the two rings "overlap" (i.e. contain atoms in common, as in the previous two examples). FIG. 8a shows a 3-atom polymer linkage containing two carbon atoms and one nitrogen atom where one ring 701 includes two of the three linkage atoms and the other ring 702 includes all three linkage atoms. FIGS. 8b and 8c show 3-atom polymer linkages of two nitrogen atoms and one carbon atom where one ring (713 and 725) contains two linkage atoms and the other ring (714 and 726) contains all three atoms. FIGS. 8d and 8e both show 3-atom linkages where the two rings both contain only two linkage atoms each. However, in FIG. 8d, the two rings contain a common non-linkage atom 732, which successfully constrains the linkage against rotation. This is not the case in FIG. 8e where the two rings fail to overlap and there is conformational indeterminacy about the central carbon-carbon bond 748. A third, additional bonding feature would be needed to constrain rotation about this carbon-carbon bond.

Figure 9A:
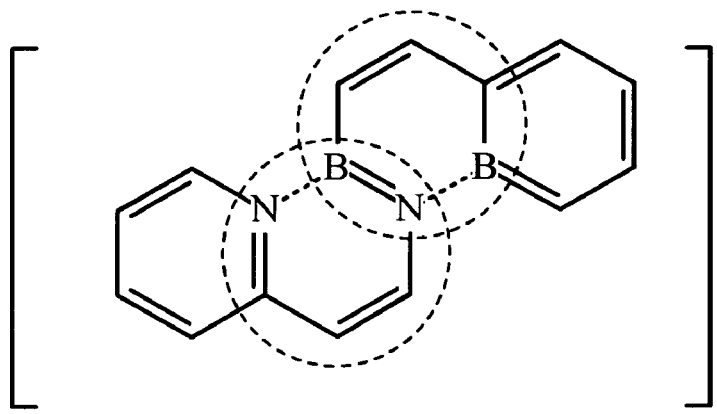
FIGS. 9a-b show examples of nearest neighbor aromatic moieties bonded through direct bond linkages with more than three atoms and stabilized through conformational ring structures, in accordance with further embodiments of the invention.
Figure 9B:
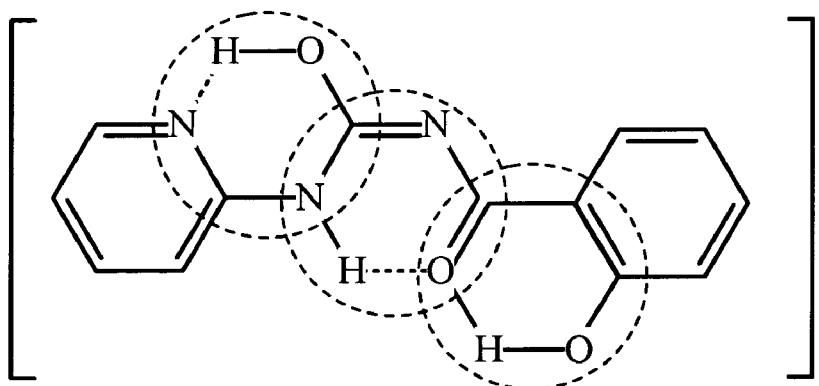

FIGS. 9a-b show examples of nearest neighbor aromatic moieties bonded through direct bond linkages with more than three atoms and stabilized through conformational ring structures, in accordance with further embodiments of the invention. Although bond linkages involving more than three atoms may be impractical, they can be never-the-less stabilized by this invention. FIG. 9a shows an example of a six-atom linkage which is constrained by only two rotation-restricting ring systems. The six-atom linkage is successfully constrained only because both of the rings contain four linkage atoms each, two of which are common to both rings, which results in the "overlap" that is required. Although long linkages can be constrained against rotation by inclusion of a larger number of linkage atoms in fewer linkages, they can also be constrained by greater numbers of rings containing fewer linkage atoms in each. FIG. 9b shows a four-atom linkage stabilized by three ring systems.

Figure 10:
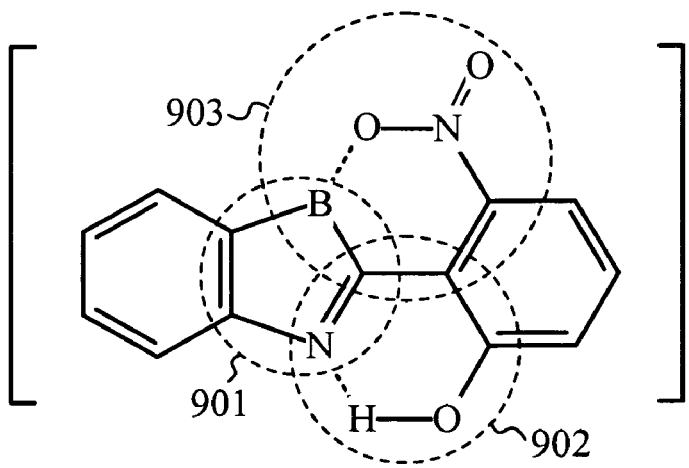
FIG. 10 illustrates an example of nearest neighbor aromatic moieties bonded through a two-atom direct bond linkage and stabilized through parallel conformational ring structures, in accordance with still further embodiments of the invention.

FIG. 10 illustrates an example of nearest neighbor aromatic moieties bonded through a two-atom direct bond linkage and stabilized through parallel conformational ring structures, in accordance with still further embodiments of the invention. The previous examples of ring-stabilized polymer linkages involve single overlapping rings. This is not meant to imply that parallel (redundant) stabilizing rings are not possible, or desirable. In FIG. 10, the covalent borazole ring 901 stabilizes the ring-nitrogen and nitrogen-carbon linkage bonds, and two hydrogen-bond rings (902, 903) stabilize the nitrogen-carbon and carbon-ring linkage bonds. Because the boron atom is a Lewis acid and the linkage nitrogen atom is a Lewis base, the linkage has only one conformation, which is enforced by dual (parallel) bonding features: 1) the pairing of the Lewis acid phenol proton with the linkage nitrogen atom (forming ring 902), and 2) the pairing of the Lewis base nitro oxygen atom with the boron atom (forming ring 903).

Figure 11A:
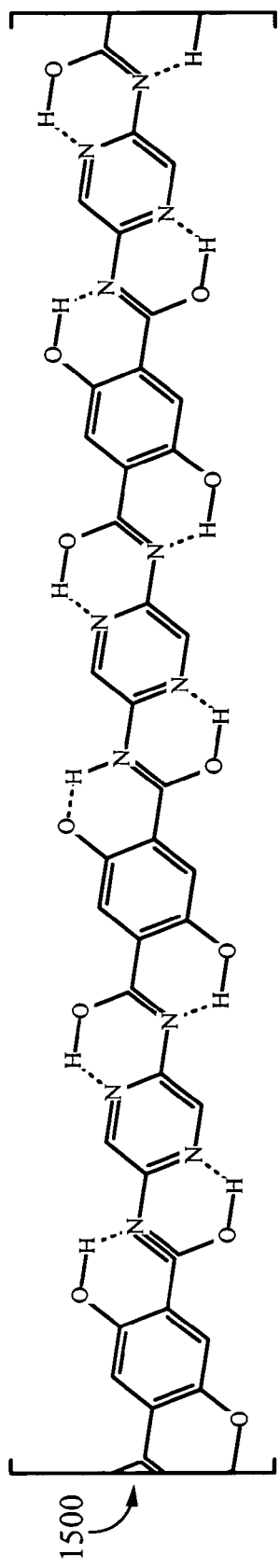
FIGS. 11a-b show extended portions of polymer backbones with nearest neighbor aromatic moieties bonded through amide direct bond linkages and stabilized through conformational ring structures, in accordance with further embodiments of the invention.
Figure 11B:
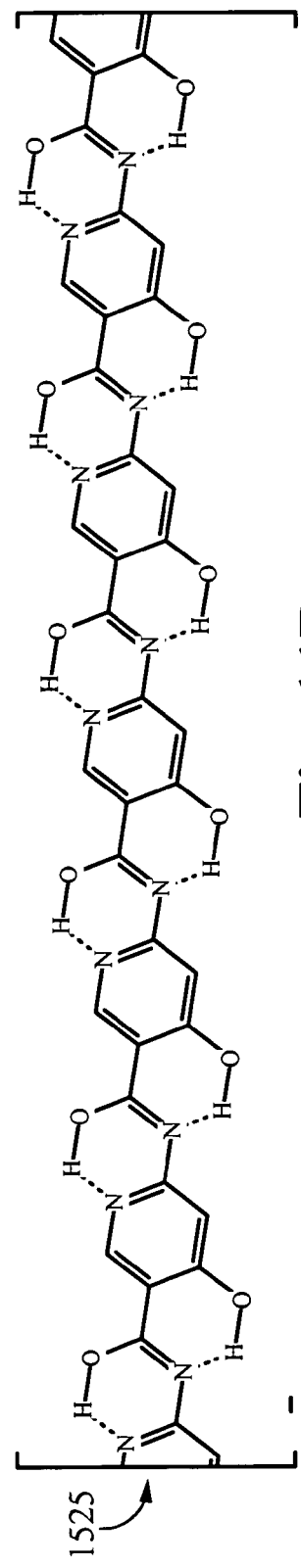

FIGS. 11a-b show extended portions of polymer backbones with nearest neighbor aromatic moieties bonded through amide direct bond linkages and stabilized through conformational ring structures, in accordance with further embodiments of the invention. FIG. 11a shows a portion of a amide polymer backbone 1500 that can be formed by combining an aromatic dicarboxylic acid precursor and a heterocyclic diamine precursor. The aromatic dicarboxylic acid precursor used to form the amide polymer backbone 1500 has reactive carboxylic acid groups that are positioned para with respect to each other on an aromatic ring and the heterocyclic diamine precursor used to form the amide polymer backbone 1500 has reactive amine groups that are positioned para with respect to each other on a heterocyclic ring. Note each of the nearest neighbor aromatic moieties in this amide polymer backbone 1500 are bonded through amide direct bond linkages and stabilized through conformational ring structures.

FIG. 11b shows a portion of an amide polymer backbone 1525 that can be derived from a heterocyclic amino-acid precursor by a self polymerization process. The heterocyclic amino acid precursor used to form the amide polymer backbone 1525 has a reactive carboxylic acid group and a reactive amine group that are positioned para with respect to each other on a heterocyclic ring. Again, each of the nearest neighbor aromatic moieties in this amide polymer backbone 1525 is bonded through amide direct bond linkage and stabilized through conformational ring structures.

Figure 12B:
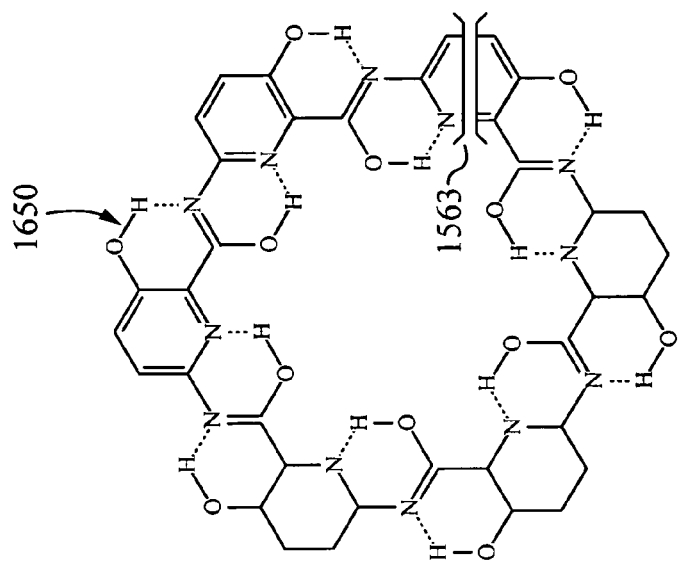
FIGS. 12a-b show extended and coiled portions of polymer backbones with nearest neighbor aromatic moieties bonded through amide direct bond linkages and stabilized through conformational ring structures, in accordance with further embodiments of the invention.
Figure 12A:
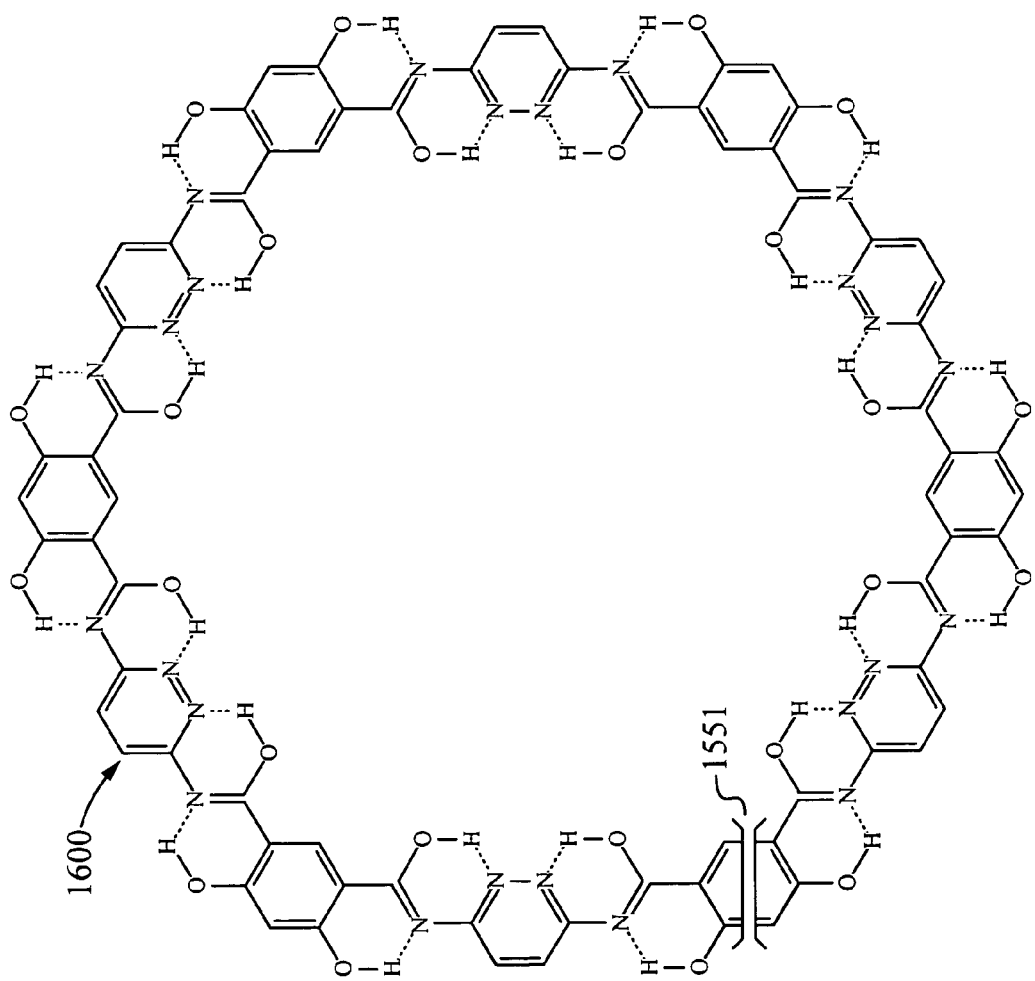

FIGS. 12a-b show extended and coiled portions of polymer backbones with nearest neighbor aromatic moieties bonded through amide direct bond linkages and stabilized through conformational ring structures, in accordance with further embodiments of the invention. FIG. 12a shows a portion of amide polymer 1600 that has substantial curvature resulting from a combination of alternating meta-orientated dicarboxylic monomer and para-orientated diamine heterocyclic monomers. The amide polymer 1600 circles around to a point 1551 where the amide polymer 1600 can terminate or, alternatively, can continue to extend in a spiral or helical fashion.

FIG. 12b shows a portion of an amide polymer 1650 that exhibits even greater curvature than the polymer 1600. The polymer 1650 results from the self-polymerization of a heterocyclic amino-acid monomer. In this case, a carboxylic acid group is positioned meta relative to the reactive amine group. The amide polymer 1650 formed by the reaction described above can circle around to a point 1563 where the amide polymer 1650 can terminate or, alternatively, can extend in a spiral or helical fashion. Addition examples of extended polymers with backbone structures that have amide direct bond linkages between nearest neighbor aromatic moieties and that have conformational ring structures that stabilize the conformation of the polymer backbone are further described in the U.S. patent application Ser. No. 10/788,509, titled "AROMATIC AMIDE POLYMER SYSTEMS AND METHODS FOR MAKING THE SAME", referenced previously.

Figure 13A:
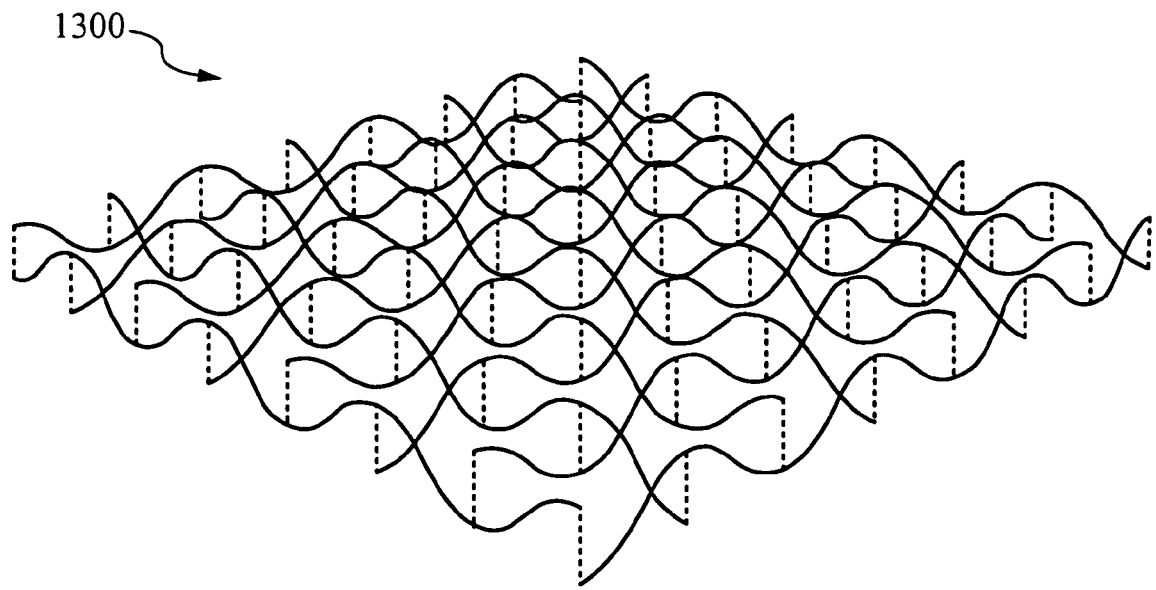
FIGS. 13a-b show schematic representations of a layered three-dimensional structure and a coiled structure formed by polymer and polymer systems with conformational linkage units bonding nearest neighbor aromatic moieties, in accordance with the embodiments of the invention.
Figure 13B:
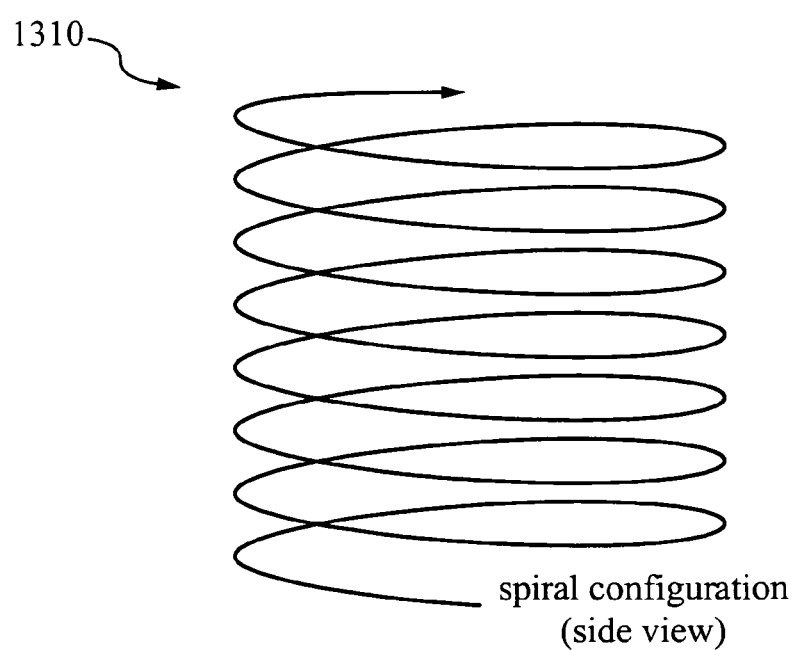

FIGS. 13a-b show schematic representations of a layered three-dimensional structure and a coiled structure formed by polymer and polymer systems with conformational linkage units bonding nearest neighbor aromatic moieties, in accordance with the embodiments of the invention. The aromatic nature of the polymer backbones and the conformational restrictions imposed by the boding between nearest neighbor aromatic moieties allow for the polymers of the present invention to assemble into or form extended three-dimensional structures. For example, it is believed that polymers of the present invention can form a woven sheet structure 1300, such as illustrated in FIG. 13a, wherein the aromatic moieties are in the planes of the stacked sheet structure 1300. It is also believe that the polymers of the present invention can form a stacked coil structure 1310, such as illustrated in FIG. 13b, wherein aromatic moieties within the stacked coil structure eclipsing or partially eclipse each other.

This invention provides a systematic approach to creating rotation-restricted and movement-inhibited polymer linkages which allow preservation and conservation of stereospecific monomer features down the length of the polymer. Each kind of stereospecific polymer linkage can be created by selected combinations of one, two or more members of a family or set of monomers which is defined by the presence of the requisite chemical groups attached to a monocyclic or polycyclic aromatic structure. This necessarily includes all isomers and analogs of the minimal (unsubstituted) monomers in the set. Each set of monomers constitutes a "nanostructural toolset" for designing and assembling nanostructures and nanostructural sub-assemblies (dimers, trimers and oligomers). The stereo-determinism of the polymer linkages extends to stereo-determinism in oligomers and to "vector directionality" in derived polymers. In addition, this invention includes "hybrid" monomers that may contain the requisite groups for forming two or more different stereospecific linkages on the same monomer. These "bridging" or "welding" monomers allow 1) the integration of different nanostructural toolsets in the design, synthesis and manufacture of nanostructural substances and materials, and 2) the use of different chemistries during different phases of molecular assembly. Other objects, aspects and advantages of this invention will become apparent to those skilled in the art from a reading of the above descriptions and examples. Various modifications, extensions and/or refinements to this invention may be made without departing from the scope of the invention.

What is claimed is:

1. A polymer comprising a backbone structure, wherein the backbone structure comprising aromatic moieties that are bonded together through conformational linkage units, wherein the conformation linkage comprising a structure represented by the formula [—C(O)=N—], wherein the oxygen atom, the nitrogen atom, or both atoms couples with the aromatic moieties forming conformational ring structure that fix the conformation of the aromatic moieties and give the polymer vector directionality.

2. The polymer of claim 1, wherein the conformational linkage units include direct bond linkages of 2 to 6 atoms.

3. The polymer of claim 2, wherein the conformational linkage units include one or more five-membered or six-membered conformational ring structures.

4. The polymer of claim 3, wherein the conformational ring structures include metal atoms.

5. The polymer of claim 4, wherein the metal atoms are cationic s-block group I or group II metal atoms selected from the group consisting of lithium, beryllium, sodium, magnesium, potassium and calcium.

6. The polymer of claim 3, wherein the conformational ring structures include hetero-atoms, wherein the hetero-atoms are selected from the group consisting of nitrogen, oxygen and sulfur.

7. The polymer of claim 6, wherein the conformational ring structures include metal atoms.

8. The polymer of claim 1, wherein the aromatic moieties are heterocyclic aromatic moieties.

9. The polymer of claim 8, wherein the heterocyclic aromatic moieties include nitrogen atoms.

10. The polymer of claim 1, wherein the polymer backbone forms repeating units, wherein the repeating units are columnar structures, tube structures or sheet structures defined by the polymer backbone.

11. A vector directional polymer forming and extended array of repeating polymer backbones, wherein the polymer backbones comprise conformational linkages forming conformational heterocyclic structure that bond nearest neighbor aromatic moieties, wherein at least one of the nearest neighbor aromatic moieties comprises a heterocyclic aromatic moiety, wherein the heterocyclic aromatic moiety couples with the conformational linkages forming the conformational heterocyclic structure that fixes the conformational structure of the neighbor aromatic moieties.

12. The polymer of claim 11, wherein the conformational heterocyclic structures form direct bond linkages that include 2 to 6 atoms that covalently bond nearest neighbor aromatic moieties.

13. The polymer of claim 12, wherein the conformational heterocyclic structures include one or more of nitrogen, oxygen and sulfur atoms.

14. The polymer of claim 11, wherein the heterocyclic aromatic moieties include nitrogen atoms.

15. The polymer of claim 11, wherein the polymer backbones form columnar structures, tube structures or sheet structures defined by the polymer backbones.

16. A polymer aromatic moieties bonded through conformational ring structures that are conformational heterocyclic structures and that include direct bond linkages of 2-6 atoms that directly bond neighboring aromatic moieties, wherein the conformation structure comprising a structure represented by the formula [—C(O)=N—], wherein the oxygen atom, the nitrogen atom, or both atoms couples with the aromatic moieties forming conformational ring structure that fix the conformation of the aromatic moieties and give the polymer vector directionality.

17. The polymer of claim 16, wherein the conformational heterocyclic structures include one or more of nitrogen atoms, oxygen atoms and sulfur atoms.

18. The polymer of claim 16, wherein the aromatic moieties are heterocyclic aromatic moieties.

19. The polymer of claim 18, wherein the heterocyclic aromatic moieties include nitrogen atoms.

20. The polymer of claim 16, wherein the polymer forms columnar structures, tube structures or sheet structures.

21. The polymer of claim 16, wherein the conformational ring structures include metal atoms.

22. The polymer of claim 1, wherein at least one of the aromatic moieties comprises a function group having a proton capable of forming a hydrogen bond with an atom on the conformational linkage units.

23. The polymer of claim 8, wherein the conformational linkage units comprise at least one proton capable of forming a hydrogen bond with at least one of the heterocyclic aromatic moieties.

24. A polymer with an backbone structure comprising conformational linkage units having a structure represented by the formula [—Ar(OH)—C(OH)=N-Ht(OH)—], wherein Ht are heterocycles comprising hetero-atoms, wherein the hetero-atoms being positioned beta relative to nitrogen atoms forming the conformational linkage units, wherein the backbone structure comprising aromatic moieties that are bonded together through the conformational linkage units that fix the conformation of the aromatic moieties and give the polymer vector directionality.

25. The polymer of claim 1, wherein the oxygen atom, the nitrogen atom, or both atoms of the conformational linkage units directly connect to at least one of the aromatic moieties.

* * * * *